US011202052B2

(12) United States Patent
Kerbiriou et al.

(10) Patent No.: US 11,202,052 B2
(45) Date of Patent: Dec. 14, 2021

(54) METHOD FOR DISPLAYING, ON A 2D DISPLAY DEVICE, A CONTENT DERIVED FROM LIGHT FIELD DATA

(71) Applicant: InterDigital CE Patent Holdings, SAS, Paris (FR)

(72) Inventors: Paul Kerbiriou, Thorigné-Fouillard (FR); Valerie Allie, Cesson-Sevigne (FR); Tristan Langlois, Cesson-Sevigne (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 110 days.

(21) Appl. No.: 16/622,269

(22) PCT Filed: Jun. 7, 2018

(86) PCT No.: PCT/EP2018/065033
§ 371 (c)(1),
(2) Date: Dec. 12, 2019

(87) PCT Pub. No.: WO2018/228918
PCT Pub. Date: Dec. 20, 2018

(65) Prior Publication Data
US 2020/0204780 A1  Jun. 25, 2020

(30) Foreign Application Priority Data
Jun. 12, 2017  (EP) .................................... 17305707

(51) Int. Cl.
*H04N 13/122* (2018.01)
*H04N 13/383* (2018.01)
*G06T 15/20* (2011.01)

(52) U.S. Cl.
CPC ........... *H04N 13/122* (2018.05); *G06T 15/20* (2013.01); *H04N 13/383* (2018.05); *H04N 2213/005* (2013.01); *H04N 2213/006* (2013.01)

(58) Field of Classification Search
CPC ............... H04N 13/122; H04N 13/383; H04N 2213/005; H04N 2213/006; G06T 15/205
See application file for complete search history.

(56) References Cited

U.S. PATENT DOCUMENTS 6,097,394 A * 8/2000 Levoy .................. H04N 13/232
345/419
7,792,423 B2 * 9/2010 Raskar ............... G02B 27/0075
250/237 R
(Continued)

FOREIGN PATENT DOCUMENTS

CN         102117180 A      7/2011
CN         104798370 A      7/2015
(Continued)

OTHER PUBLICATIONS

Geng, Wenjing, et. al. "Flat3D: Browsing Stereo Images on a Conventional Screen". International Conference on Multimedia Modeling, (2015), pp. 546-558.
(Continued)

*Primary Examiner* — Brian P Yenke
(74) *Attorney, Agent, or Firm* — Invention Mine LLC

(57) ABSTRACT

The present disclosure concerns a method for displaying, on a 2D display device, a content derived from 4D light field data, based on a viewing position of a user. The 4D light field data corresponds to data acquired by either several cameras or by a plenoptic device. The method comprises: obtaining a volume in front of said 2D display device in which no disocclusions are present, said volume being defined according to optical and geometry parameters of an acquisition
(Continued)

device that has acquired said 4D light field data, a size of a screen of said 2D display device, and an anchor plane in said content, said anchor plane being perceived as static in case of movement of a user relative to said 2D display device; determining a modified volume from said volume, comprising modifying a size of said volume, for modifying possible movements of a user positioned within the modified volume compared to movements of said user within said volume; providing means for guiding said user within said modified volume according to said viewing position of said user.

30 Claims, 16 Drawing Sheets

(56) References Cited

U.S. PATENT DOCUMENTS

| | | | |
|---|---|---|---|
| 8,416,289 B2 | 4/2013 | Akeley | |
| 8,803,918 B2* | 8/2014 | Georgiev | H04N 17/002 345/643 |
| 8,823,771 B2* | 9/2014 | Jeong | G06T 15/40 348/43 |
| 8,933,862 B2 | 1/2015 | Lapstun | |
| 8,995,785 B2* | 3/2015 | Knight | H04N 5/23293 382/275 |
| 9,060,093 B2 | 6/2015 | Chu | |
| 9,098,112 B2 | 8/2015 | Cheng et al. | |
| 9,132,352 B1* | 9/2015 | Rabin | A63F 13/30 |
| 9,214,013 B2* | 12/2015 | Venkataraman | G06T 5/005 |
| 10,033,986 B2* | 7/2018 | Pitts | H04N 13/232 |
| 10,104,370 B2* | 10/2018 | Fusama | H04N 13/383 |
| 10,182,183 B2 | 1/2019 | Sabater | |
| 10,313,633 B2* | 6/2019 | Rosenberg | H04N 7/15 |
| 10,390,005 B2* | 8/2019 | Nisenzon | G06T 7/55 |
| 10,444,931 B2* | 10/2019 | Akeley | G06F 3/012 |
| 10,474,227 B2* | 11/2019 | Carothers | H04N 13/232 |
| 10,540,818 B2* | 1/2020 | Akeley | G06T 19/006 |
| 10,545,215 B2* | 1/2020 | Karafin | G01S 3/7803 |
| 10,679,361 B2* | 6/2020 | Karnad | G06T 7/251 |
| 10,679,373 B2* | 6/2020 | Riemens | H04N 13/106 |
| 10,852,838 B2* | 12/2020 | Bradski | H04N 13/204 |
| 2004/0075735 A1 | 4/2004 | Marmaropoulos | |
| 2007/0285554 A1* | 12/2007 | Givon | H04N 13/204 348/340 |
| 2010/0091092 A1* | 4/2010 | Jeong | H04N 13/349 348/43 |
| 2011/0157154 A1 | 6/2011 | Bernard | |
| 2011/0273466 A1 | 11/2011 | Imai et al. | |
| 2012/0182299 A1* | 7/2012 | Bowles | G06T 15/205 345/426 |
| 2013/0278719 A1* | 10/2013 | Rusert | G06T 15/10 348/43 |
| 2014/0028662 A1 | 1/2014 | Liao et al. | |
| 2014/0036046 A1* | 2/2014 | Hasegawa | H04N 13/31 348/54 |
| 2014/0146148 A1 | 5/2014 | Maciocci | |
| 2014/0306963 A1* | 10/2014 | Sun | G06T 15/08 345/427 |
| 2015/0215600 A1* | 7/2015 | Norkin | H04N 13/111 348/43 |
| 2015/0235408 A1 | 8/2015 | Gross et al. | |
| 2015/0362743 A1 | 12/2015 | Lanman | |
| 2016/0201776 A1* | 7/2016 | Takase | B63H 20/12 74/89.23 |
| 2016/0309081 A1* | 10/2016 | Frahm | G06K 9/00604 |
| 2017/0003507 A1 | 1/2017 | Raval | |
| 2017/0091983 A1* | 3/2017 | Sebastian | G06T 15/205 |
| 2017/0148186 A1* | 5/2017 | Holzer | H04N 5/265 |
| 2017/0188002 A1* | 6/2017 | Chan | H04N 13/128 |
| 2017/0243373 A1* | 8/2017 | Bevensee | G03B 35/10 |
| 2018/0020204 A1* | 1/2018 | Pang | H04N 13/156 |
| 2018/0046874 A1* | 2/2018 | Guo | G06K 9/3208 |
| 2018/0097867 A1* | 4/2018 | Pang | H04N 19/103 |
| 2018/0253884 A1* | 9/2018 | Burnett, III | G06T 15/005 |
| 2019/0236796 A1* | 8/2019 | Claret | G06T 7/13 |
| 2019/0385323 A1* | 12/2019 | Doyen | H04N 13/232 |
| 2020/0059635 A1* | 2/2020 | Katsumata | H04N 13/243 |
| 2020/0074658 A1* | 3/2020 | Yu | G06T 7/557 |
| 2020/0134849 A1* | 4/2020 | Claret | G06T 7/593 |
| 2020/0410635 A1* | 12/2020 | Varanasi | G06T 15/205 |
| 2021/0103148 A1* | 4/2021 | Hua | H04N 13/344 |

FOREIGN PATENT DOCUMENTS

| | | |
|---|---|---|
| CN | 105488771 A | 4/2016 |
| CN | 106210465 A | 12/2016 |
| CN | 106210538 A | 12/2016 |
| CN | 106501635 A | 3/2017 |
| EP | 2863635 A1 | 4/2015 |
| EP | 3099055 A1 | 11/2016 |
| GB | 2488905 | 9/2012 |
| WO | 2013180192 | 12/2013 |
| WO | 2014149403 | 9/2014 |

OTHER PUBLICATIONS

Feldmann, Ingo, et. al., "Navigation Dependent Nonlinear Depth Scaling". Proceedings of 23rd International Picture Coding Symposium, Apr. 23-25, 2003, 4 pages.

Buchanan, P., et. al., "Creating a View Dependent Rendering System for Mainstream Use". IEEE 23rd International Conference Image and Vision Computing, (2008), 6 pages.

Řeřabek, Martin, et. al., "Motion Parallax Based Restitution of 3D Images on Legacy Consumer Mobile Devices". IEEE 13th International Workshop on Multimedia Signal Processing, (2011), 5 pages.

Hoang, Anh Nguyen, et. al., "A Virtual Reality System Using View-Dependent Stereoscopic Rendering". IEEE International Conference on Information Science & Applications (ICISA), (2014), 4 pages.

Angco, Marc Jordan G., et. al., "Depth Perception Through Adaptive 3D View Perspective and Motion Parallax". IEEE Asia Pacific Conference on Wireless and Mobile, (2015), pp. 83-88.

Levin, Anat, et. al., "Understanding Camera Trade-Offs Through a Bayesian Analysis of Light Field Projections". Proceedings of European Conference on Computer Vision, (2008), pp. 1-14.

Ng, Ren, et. al., "Digital Light Field Photography". A Dissertation Submitted to the Department of Computer Science and the Committee on Graduate Studies of Stanford University, Jul. 2006, 203 pages.

Wanner, Sven, et. al., "Generating EPI Representation of a 4D Light Fields with a Single Lens Focused Plenoptic Camera". International Symposium on Visual Computing (ISVC), (2011), pp. 90-101.

Merkle, Philipp, et. al., "Efficient Prediction Structures for Multiview Video Coding". IEEE Transactions on Circuits and Systems for Video Technology, vol. 17, No. 11, Nov. 2007, pp. 1461-1473.

Hirsch, Matthew, et. al., "A Compressive Light Field Projection System". ACM Transactions on Graphics vol. 33, No. 4, (2014), 20 pages.

Muddala, Suryanarayana, et. al., "Depth-Included Curvature Inpainting for Disocclusion Filing in View Synthesis". International Journal on Advances in Telecommunications, vol. 6 No. 3 & 4, (2013), pp. 132-142.

Fehn, Christoph, et. al., "Key Technologies for an Advanced 3D-TV System". Three-Dimensional TV, Video, and Display III, Proceedings of SPIE, vol. 5599, (2004), pp. 66-80.

International Search Report and Written Opinion of the International Searching Authority for PCT/EP2018/065033, dated Sep. 20, 2018.

International Preliminary Report on Patentability for PCT/EP2018/065033 dated Dec. 17, 2019, 6 pages.

Shreiner, Dave, et. al., "Homogeneous Coordinates and Transformation Matrices". OpenGL Programming Guide 8th edition, Appendix E, Mar. 2013, pp. 829-834.

* cited by examiner

METHOD FOR DISPLAYING, ON A 2D DISPLAY DEVICE, A CONTENT DERIVED FROM LIGHT FIELD DATA

This application claims the benefit, under 35 U.S.C. § 365 of International Application PCT/EP2018/065033, filed Jun. 7, 2018, which was published in accordance with PCT Article 21(2) on Dec. 20, 2018, in English, and which claims the benefit of European Patent Application No. 17305707.6 filed Jun. 12, 2017.

TECHNICAL FIELD

The present disclosure relates to the rendering of a content obtained from a multi view content on a 2D display device. Particularly, but not exclusively, the present disclosure is directed to the rendering of content derived from light field content (being either a sequence of light field images (i.e. a light field video) or only a light field image) on a display device that can display 2D content.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

The acquisition and rendering of 4D light field data (also named light field content), which can be viewed as a sampling of a 4D light field (i.e. the recording of light rays as explained in FIG. 1 of the article:" *Understanding camera trade-offs through a Bayesian analysis of light field projections*" by Anat Levin et al., published in the conference proceedings of ECCV 2008) is an hectic research subject.

Indeed, compared to classical 2D images obtained from a camera, 4D light field data enable a user to have access to more post processing features that enhance the rendering of images and/or the interactivity with the user. For example, with 4D light field data, it is possible to perform with ease refocusing of images a posteriori (i.e. refocusing with freely selected distances of focalization meaning that the position of a focal plane can be specified/selected a posteriori), as well as changing slightly the point of view in the scene of an image. The acquisition of 4D light field data can be done by different techniques (for example via the use of plenoptic camera, as depicted in document WO 2013/180192 or in document GB 2488905, or via the use a camera array as depicted in document WO 2014/149403).

In the state of the art, there are several ways to represent (or define) 4D light-field data. Indeed, in the Chapter 3.3 of the Phd dissertation thesis entitled "*Digital Light Field Photography*" by Ren Ng, published in July 2006, three different ways to represent 4D light-field data are described. Firstly, 4D light-field data can be represented, when recorded by a plenoptic camera by a collection of micro-lens images (also named micro-images in the state of the art). 4D light field data in this representation are named raw images (or raw 4D light field data). Secondly, 4D light field data can be represented, by a set of sub-aperture images. A sub-aperture image corresponds to a captured image of a scene from a point of view, the point of view being slightly different between two sub-aperture images. These sub-aperture images give information about the parallax and depth of the imaged scene. Thirdly, 4D light field data can be represented by a set of epipolar images (see for example the article entitled: "*Generating EPI Representation of a 4D Light Fields with a Single Lens Focused Plenoptic Camera*", by S. Wanner et al., published in the conference proceedings of ISVC 2011).

It should be noted that in addition to these representations, depth maps can also be derived and stored on electronic devices with a matrix of views, in order to speed-up some image processing methods applied on 4D light field data. Then, it is possible to encode 4D light field data via the use of the multiview video plus depth (MVD) format as described in the document entitled "*Efficient prediction structures for multiview video coding*", by Merkle P, Smolic A, Muller K, Wiegand T. EEE Trans. Circ. Syst. Video Technol. 2007; 17:1461-1473. In the following, by abuse of language, MVD data can refer to a set of images (with RGB pixel values), and each of these images are associated with a depth map.

Usually, 4D light field data can be used for displaying at least one 2D image in which refocusing a posteriori can be done (i.e. the display device is a conventional display device). But, it is also possible to display these 4D light field data via a light field display device as the one depicted in document U.S. Pat. No. 8,933,862, or in the document U.S. Pat. No. 8,416,289. In a variant, the light field display device can be the one depicted in the article entitled "*A Compressive Light Field Projection System*" by M. Hirsch, G. Wetzstein, R. Raska, published in the conference proceedings of SIGGRAPH 2014. In this document, 4D light field data corresponds to data acquired by either several cameras or by a plenoptic device (i.e. 4D light field data corresponds to real acquired data). Hence, 4D light field data cannot be assimilated to CGI content.

However, light field display devices are not widespread for the moment. Hence, in order to be able to benefit from the flexibility (in term of viewing possibilities) offered from the processing on an acquired light field content, even on conventional display device (i.e. display device that can deliver 2D content such as conventional mobile phones or conventional tablets, etc.), it appears that an alternative processing on light field content acquired from an acquisition device (being either a camera array or a plenoptic camera) has to be done.

One skilled in the art could have tried to adapt the technique described in the article "*Flat3D: browsing stereo images on a conventional screen*" by Wenjing Geng et al., that proposes to use motion parallax via a specific display of a sequence of images (i.e. an animation).

However, due to the specific properties of light field content (especially the different viewing angles of sub-aperture images in a matrix of views), the determination of a sequence of images to be displayed for obtaining an animation is a difficult task.

The proposed technique is an alternative to the technique mentioned in the previously cited article, in the sense that it aims at displaying on a conventional display device a content derived from a light field content.

SUMMARY OF THE DISCLOSURE

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present disclosure is directed to a method for displaying, on a 2D display device, a content derived from 4D light field data, based on a viewing position of a user. The method is remarkable in that it comprises:

obtaining a volume in front of said 2D display device in which no disocclusions are present, said volume being defined according to optical and geometry parameters of an acquisition device that has acquired said 4D light field data, a size of a screen of said 2D display device, and an anchor plane in said content, said anchor plane being perceived as static in case of movement for a user;

determining a modified volume from said volume, comprising modifying a size of said volume, for modifying possible movements of a user positioned within the modified volume compared to movements of said user within said volume;

providing means for guiding said user within said modified volume according to said viewing position of said user.

It should be noted that the volume in front of said 2D display device in which no disocclusions are present is linked to the parameters of the acquisition system (either a plenoptic device or a set of cameras) and the size (width and height) of the 2D display device. Hence, there are some volumes in front of said 2D display device in which disocclusions are present.

Hence, according to one embodiment of the disclosure, it is proposed to display from a conventional display device (such as a mobile phone or a tablet, etc.), content derived from 4D light field data, enabling a user to have the feeling of watching a content through a window, by moving the head in a specific zone/volume located in front of the 2D display device, where such specific zone/volume does not comprise disocclusions (i.e. pixels for which no information (such as illumination and/or depth values) are available). It should be noted that the presence of holes or disocclusions does not appear when a CGI content is used. However, in the present context, due to the manipulation of content from 4D light field data, disocclusions regions (i.e. regions where holes or disocclusion can be present due to the use of an acquisition device) exist and the present technique provides information to the user on the volume, in front of the screen, where regions in which such holes or disocclusion are present, do not have to be displayed.

In addition, elements or objects comprised in the anchor plane should appear as static or fixed even if the user moves his head (in the sense that no motion parallax occurs for elements or objects comprised in such anchor plane). Hence, such anchor plane can be viewed in a way as the plane of the screen of the 2D display device.

According to the present technique, the user is informed when disocclusions regions may be displayed. Contrary to techniques of the state of the art where disocclusions regions are filled with some values via an inpainting process (such as in the article entitled "*Depth-Included Curvature Impainting for disocclusion filing in view synthesis*" by S. M. Muddala et al.), the proposed technique enables the guiding of a user for preventing the apparition of disocclusions regions.

In a preferred embodiment, said modifying uses a head sensibility parameter of said user and/or an estimated distance between said user and said screen of said 2D display device.

In a preferred embodiment, the acquisition device is either a camera array device or a plenoptic camera.

In a preferred embodiment, the method further comprises obtaining said viewing position of said user via an eye tracker device.

In a preferred embodiment, the method further comprises selecting said at least one anchor plane by said user.

Hence, in one embodiment of the disclosure, the user can explicitly select or choose a specific anchor plane (i.e. via the entering or selection of a depth value) via a user interface for example.

In a preferred embodiment, the method further comprises automatically determining said at least one anchor plane according to a position of said user.

In a variant of the disclosure, an electronic device can automatically select or determine a specific anchor plane (i.e. a depth value) via a position of the user. The position of the user can be estimated via an eye-tracker device. Therefore, the user is always positioned in a modified volume. The value of depth value associated with the anchor plane can be pre-determined and stored in a memory unit. In a variant, once the automatic process is performed, the user can still have the possibility to modify the depth value according to his viewing preferences.

In a preferred embodiment, the 4D light field data is represented via a point cloud representation.

In a preferred embodiment, the 4D light field data is represented via a matrix of views and depth maps.

In a preferred embodiment, said providing comprises displaying on said screen of said display device means for guiding corresponding to visual indicators.

In a preferred embodiment, said visual indicators belong to a group comprising:

luminosity variation of a scene associated with said displayed content derived from 4D light field data;

arrows.

In one embodiment of the disclosure, it is proposed to reduce the luminosity (or the brightness) of the scene in the case the user approaches a region comprising disocclusions. In that case, the darker the scene is, the closer to such region the user is. Hence, the scene fades out to black. In a variant, it is proposed to increase the luminosity of the scene in the case the user approaches a region comprising disocclusions. In that case, the brighter the scene is, the closer to such region the user is. Hence, the scene fades out to white.

In a preferred embodiment, said providing comprises delivering by said display device means for guiding corresponding to audio indicators.

In a preferred embodiment, said volume is further defined according to a scene scaling parameter and/or a scene translation parameter chosen by said user.

In a preferred embodiment, said modifying a size of said volume further comprises increasing a size of a modified volume compared to said volume, for enabling wider movements of a user positioned within the modified volume compared to movements of said user within said volume.

In a preferred embodiment, said modifying a size of said volume further comprises reducing a size of a modified volume compared to said volume, for reducing a scope of movements of a user positioned within the modified volume compared to movements of said user within said volume.

According to an exemplary implementation, the different steps of the method are implemented by a computer software program or programs, this software program comprising software instructions designed to be executed by a data processor of a relay module according to the disclosure and being designed to control the execution of the different steps of this method.

Consequently, an aspect of the disclosure also concerns a program liable to be executed by a computer or by a data processor, this program comprising instructions to command the execution of the steps of a method as mentioned here above.

This program can use any programming language whatsoever and be in the form of a source code, object code or code that is intermediate between source code and object code, such as in a partially compiled form or in any other desirable form.

The disclosure also concerns an information medium readable by a data processor and comprising instructions of a program as mentioned here above.

The information medium can be any entity or device capable of storing the program. For example, the medium can comprise a storage means such as a ROM (which stands for "Read Only Memory"), for example a CD-ROM (which stands for "*Compact Disc-Read Only Memory*") or a microelectronic circuit ROM or again a magnetic recording means, for example a floppy disk or a hard disk drive.

Furthermore, the information medium may be a transmissible carrier such as an electrical or optical signal that can be conveyed through an electrical or optical cable, by radio or by other means. The program can be especially downloaded into an Internet-type network.

Alternately, the information medium can be an integrated circuit into which the program is incorporated, the circuit being adapted to executing or being used in the execution of the method in question.

According to one embodiment, an embodiment of the disclosure is implemented by means of software and/or hardware components. From this viewpoint, the term "module" can correspond in this document both to a software component and to a hardware component or to a set of hardware and software components.

A software component corresponds to one or more computer programs, one or more sub-programs of a program, or more generally to any element of a program or a software program capable of implementing a function or a set of functions according to what is described here below for the module concerned. One such software component is executed by a data processor of a physical entity (terminal, server, etc.) and is capable of accessing the hardware resources of this physical entity (memories, recording media, communications buses, input/output electronic boards, user interfaces, etc.).

Similarly, a hardware component corresponds to any element of a hardware unit capable of implementing a function or a set of functions according to what is described here below for the module concerned. It may be a programmable hardware component or a component with an integrated circuit for the execution of software, for example an integrated circuit, a smart card, a memory card, an electronic board for executing firmware etc. In a variant, the hardware component comprises a processor that is an integrated circuit such as a central processing unit, and/or a microprocessor, and/or an Application-specific integrated circuit (ASIC), and/or an Application-specific instruction-set processor (ASIP), and/or a graphics processing unit (GPU), and/or a physics processing unit (PPU), and/or a digital signal processor (DSP), and/or an image processor, and/or a coprocessor, and/or a floating-point unit, and/or a network processor, and/or an audio processor, and/or a multi-core processor. Moreover, the hardware component can also comprise a baseband processor (comprising for example memory units, and a firmware) and/or radio electronic circuits (that can comprise antennas) which receive or transmit radio signals. In one embodiment, the hardware component is compliant with one or more standards such as ISO/IEC 18092/ECMA-340, ISO/IEC 21481/ECMA-352, GSMA, StoLPaN, ETSI/SCP (Smart Card Platform), GlobalPlatform (i.e. a secure element). In a variant, the hardware component is a Radio-frequency identification (RFID) tag. In one embodiment, a hardware component comprises circuits that enable Bluetooth communications, and/or Wi-fi communications, and/or Zigbee communications, and/or USB communications and/or Firewire communications and/or NFC (for Near Field) communications.

It should also be noted that a step of obtaining an element/value in the present document can be viewed either as a step of reading such element/value in a memory unit of an electronic device or a step of receiving such element/value from another electronic device via communication means.

In another embodiment of the disclosure, it is proposed an electronic device configured to display, on a 2D display device, a content derived from 4D light field data, based on a viewing position of a user. The electronic device comprises at least one memory unit and a processor coupled to said at least one memory unit, said processor being configured to:

obtain a volume in front of said 2D display device in which no disocclusions are present, said volume being defined according to optical and geometry parameters of an acquisition device that has acquired said 4D light field data, a size of a screen of said 2D display device, and an anchor plane in said content, said anchor plane being perceived as static in case of movement for a user;

determine a modified volume from said volume, comprising modifying a size of said volume, for modifying possible movements of a user positioned within the modified volume compared to movements of said user within said volume;

provide means for guiding said user within said modified volume according to said viewing position of said user.

BRIEF DESCRIPTION OF THE DRAWINGS

The above and other aspects of the invention will become more apparent by the following detailed description of exemplary embodiments thereof with reference to the attached drawings in which.

DETAILED DESCRIPTION

In one embodiment of the disclosure, from the configuration of a 4D light field data acquisition device (or system), that can be intrinsic and/or extrinsic parameters for example, and from the configuration of a screen of a display device (such as the size/dimensions of the screen of a mobile phone or a tablet), it is proposed to determine a specific volume in front of the display device (the size of such specific volume being independent of the presence or not of a user in front of the display device). Such specific volume has the following characteristics: when a user is positioned within this specific volume, he can see the content with such a view angle there is no disocclusions. More precisely, a device such as an eye tracker can track the position of the user, and the display device displays a specific 2D image view (obtained from the 4D light field data) according to the position of the user. Hence, if the user is within the specific volume, and moves within it, then the display device displays a sequence of 2D images for which no disocclusions occur. Due to the motion parallax effect (which is a type of depth perception cue in which objects that are closer appears to move faster than objects that are further), the user perceives an immersive effect within the scene associated with the displayed content, and such without the occurrence of disocclusions. However, once the user is no more in the specific volume (or at the border of the specific volume), disocclusion regions (i.e. regions where no information are available for the pixels belonging to them) may be provided by the display device. In one embodiment of the disclosure, it is proposed to guide the user (in the three-dimensional space) in order to maintain him within this specific volume. It should be noted that the size of the volume cannot be suitable with the expectations of a user. Indeed, if the display device is a television set, the user may be positioned at several meters in front of the display device. However, the position of the user may be out of the range of the specific volume. In a variant, it is proposed to adapt such specific volume according to some parameters defined by the user. It should also be noted that the specific volume is also dependent of the selection of an anchor plane (that can control the immersion feeling of a user) as specified in the section "Scene adaptation" of the present document.

Figure 1:
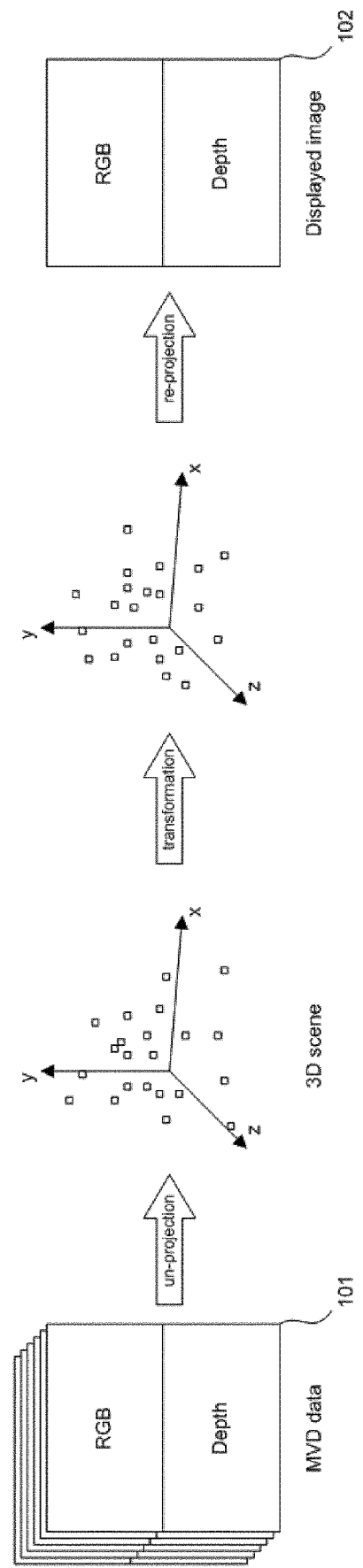
FIG. 1 depicts some processing done (un-projection, transformation and re-projection computation) on MVD data.

According to one embodiment of the disclosure, the rendering of a specific image on a conventional display device from 4D light field data represented by a set of images plus depths maps (i.e. MVD data) can be done via some processing operations as depicted in FIG. 1:

an un-projection of the original MVD data referenced 101, to obtain a 3D representation of the scene;

the application of a transformation H (for taking into account a selected anchor plane and change in the scaling of a scene);

a re-projection of those transformed 3D data to obtain modified MVD data 102 from which the specific image to be displayed can be obtained.

This last process is performed pixel per pixel in order to obtain a fast implementation though we could split it to get first a 3D point cloud then re-projection of this cloud to obtain the displayed image.

In the following, details concerning each of these three operations are given:

Concerning the Un-Projection Operation

In one embodiment of the disclosure, 4D light field data can be acquired by a camera rig (i.e. a camera rig is defined in the present document as a set of several almost aligned camera in a plane, and can also be named an array of camera (that has identical or different optical parameters)). For each camera c comprised in said camera rig, two matrices can be associated with a camera, and they are estimated by a calibration process for example. These two matrices are:

a projection matrix (also called intrinsic camera matrix) for the camera c is defined as $$K_c = \begin{bmatrix} f_u & 0 & c_u & 0 \\ 0 & f_v & c_v & 0 \\ 0 & 0 & 0 & 1 \\ 0 & 0 & 1 & 0 \end{bmatrix}$$

where $f_u$ and $f_v$ are the focal length in respectively in horizontal and vertical direction (units are pixels);

$c_u$ and $c_v$ are the horizontal and vertical coordinates of the intersection of the optical axis with the sensor image (units are pixels).

a pose matrix (also called extrinsic camera matrix) for the camera c is defined as $$P_c = \begin{bmatrix} r_{11} & r_{12} & r_{13} & T_x^c \\ r_{21} & r_{22} & r_{13} & T_y^c \\ r_{21} & r_{32} & r_{33} & T_z^c \\ 0 & 0 & 0 & 1 \end{bmatrix}$$

where $r_{11}$ to $r_{33}$ elements define a 3D rotation matrix that describes the rotation of the camera c versus the world coordinate system.

$T_x^c$, $T_y^c$ and $T_z^c$ are components of the translation of the camera c versus the world coordinate system (units are meters).

For convenience reason, the world coordinate system is assumed to be in the center of the camera rig.

Considering a pixel (u, v) of the camera c, its color (RGB) and depth (z(u, v, c)) are available (within the image and the associated depth map). Then it is possible to unproject the pixel (u, v) in the 3D space by using the following equation:

$$\begin{bmatrix} X \\ y \\ Z \\ 1 \end{bmatrix} = z_{uv} * P_c * K_c^{-1} * \begin{bmatrix} u \\ v \\ 1/z_{uv} \\ 1 \end{bmatrix} = \begin{bmatrix} T_x^c + z_{uv}\left(r_{11}\frac{u-c_u}{f_u} + r_{12}\frac{v-c_v}{f_v} + r_{13}\right) \\ T_y^c + z_{uv}\left(r_{21}\frac{u-c_u}{f_u} + r_{22}\frac{v-c_v}{f_v} + r_{23}\right) \\ T_z^c + z_{uv}\left(r_{31}\frac{u-c_u}{f_u} + r_{32}\frac{v-c_v}{f_v} + r_{33}\right) \\ 1 \end{bmatrix}$$

Hence, an electronic device can implement such processing in order to obtain (from 4D light field data represented as MVD data) a set of points in a three-dimensional space that can be stored in a memory unit of an electronic device, and processed by a processor of the electronic device.

Concerning the Re-Projection Operation

Figure 2:
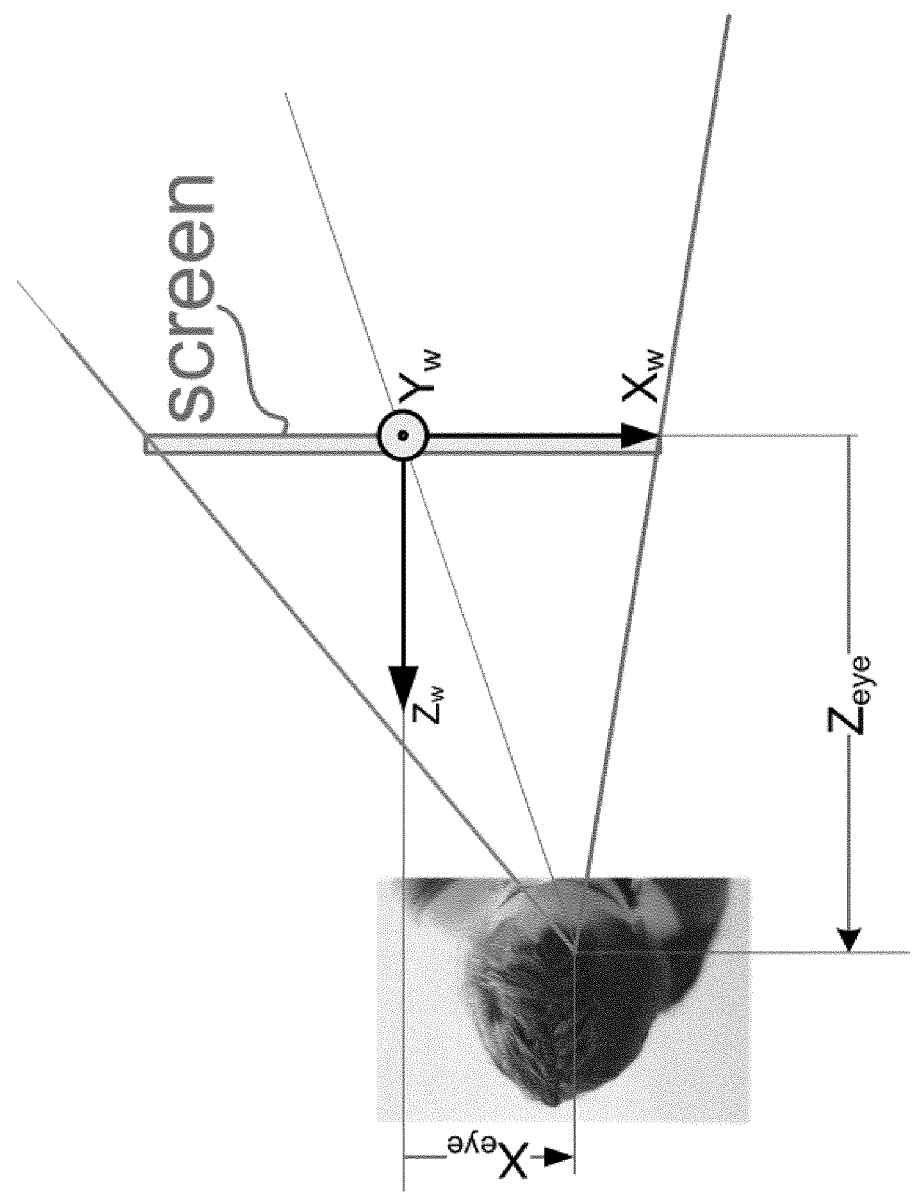
FIG. 2 presents the position of the head of a user versus the screen coordinate system.

In one embodiment of the disclosure, it is proposed to use the OpenGL matrix of projection for a projection in the context described in the FIG. 2. Such OpenGL matrix is described for example in the document "*OpenGL Programming Guide 9th edition, Appendix E*", by Dave Shreiner, Graham Sellers, John Kessenich—The Khronos OpenGL ARB Working Group—Addison Wesley editor.

In the following, we use, as reference Coordinate System (CS), the point at center of the screen (refer to $(X_w, Y_w, Z_w)$ in the FIG. 2) and dimensions are normalized with $W_{screen}/2$ or $H_{screen}/2$ (where $W_{screen}$ is the screen width and $H_{screen}$ the screen height) so that x and y dimensions are transformed in the range [−1 +1].

Then the projection matrix is defined by:

$$K_{eye} = \begin{bmatrix} \frac{Z_{eye}}{W_{screeen}/2} & 0 & -\frac{X_{eye}}{W_{screeen}/2} & 0 \\ 0 & \frac{Z_{eye}}{H_{screeen}/2} & -\frac{Y_{eye}}{H_{screeen}/2} & 0 \\ 0 & 0 & -\frac{Z_{far}+Z_{near}}{Z_{far}-Z_{near}} & 2\frac{Z_{far}Z_{near}}{Z_{far}-Z_{near}} \\ 0 & 0 & -1 & 0 \end{bmatrix}$$

where
$(X_{eye}\ Y_{eye}\ Z_{eye})^T$ represents the position of the user in this CS;
$Z_{near}$ is the Z value, from the eye position, below which points in the scene are discarded (not displayed);
$Z_{far}$ is the Z value, from the eye position, behind which points in the scene are discarded (not displayed);

We define also a matrix representing the displacement of the head versus the screen (as we have used a normalized screen, the matrix used to take into account the user translation is the following).

$$T_{eye} = \begin{bmatrix} 1 & 0 & 0 & \frac{X_{eye}}{W_{screen}/2} \\ 0 & 1 & 0 & \frac{Y_{eye}}{H_{screen}/2} \\ 0 & 0 & 0 & -\frac{Z_{eye}}{W_{screen}} \\ 0 & 0 & 0 & 0 \end{bmatrix}$$

Hence, a 3D point can be transformed by using the following equation:

$$\begin{bmatrix} u' \\ v' \\ B+AZ_{eye} \\ -Z_{eye} \end{bmatrix} = K_{eye} * T_{eye} * \begin{bmatrix} X \\ Y \\ Z \\ 1 \end{bmatrix}$$

And then it can be projected into the image by making the 4D vector homogeneous:

$$\begin{bmatrix} u \\ v \\ Z' \\ 1 \end{bmatrix}_{eye} = -1/Z_{eye} \begin{bmatrix} u' \\ v' \\ B+AZ_{eye} \\ -Z_{eye} \end{bmatrix} = \begin{bmatrix} -u'/Z_{eye} \\ -v'/Z_{eye} \\ A-B/Z_{eye} \\ 1 \end{bmatrix}$$

It should be noted that the following remarks can be done:
the minus sign can be surprising but in OpenGL representation the Z axis is toward the eye so all 3D points have negative Z value.
The $Z_{eye}$ value is consistent with a metric value, while $Z'_{eye}=A-B/Z_{eye}$ is a function of Z with a format convenient for the Z buffer algorithm.

Finally, the following equation for projecting a pixel from MVD data to the screen viewed by the user can be obtained by the following equation:

$$\begin{bmatrix} u \\ v \\ Z' \\ 1 \end{bmatrix}_{eye} = -\frac{1}{Z_{eye}} * K_{eye} * T_{eye} * H * P_c * z_{uv} * K_c^{-1} * \begin{bmatrix} u \\ v \\ 1 \\ z(u,v) \\ 1 \end{bmatrix}_c$$

where H is a transformation that should be used to adapt the scene for visualization (in term of the choice of the anchor plane (via a translation), and eventually a modification of the scaling of the scene).

The following addition remarks can be formulated: 3D CS used in vision is X rightward and Y downward; so positive Z values are in front of camera, while in 3D CGI the X axis is rightward but Y is upward, making the points in front of camera having Z negative (reason why $K_{eye}(4,3)=-1$). So we need a simple transformation between the two zones (Vision and CGI) and the previous matrices line. This transformation is a rotation of PI (i.e. π) around X axis.

$$R_{x_{Pl}} = \begin{bmatrix} 1 & 0 & 0 & 0 \\ 0 & -1 & 0 & 0 \\ 0 & 0 & -1 & 0 \\ 0 & 0 & 0 & 1 \end{bmatrix}$$

The complete equation becomes:

$$\begin{bmatrix} u \\ v \\ Z' \\ 1 \end{bmatrix}_{eye} = -\frac{1}{Z_{eye}} * K_{eye} * T_{eye} * H * R_{x_{Pl}} * P_c * z_{uv} * K_c^{-1} * \begin{bmatrix} u \\ v \\ 1 \\ \frac{1}{Z_{(u,v)}} \\ 1 \end{bmatrix}_c$$

Scene Adaptation

Figure 3:
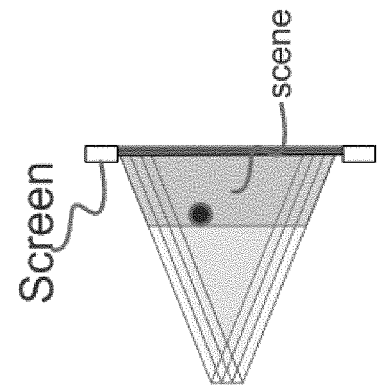
FIG. 3 presents several way to adapt the fixed plane of the scene versus the screen; the triangle is the zone viewed by the cameras (left: the immersion is poor; center: the feeling is to see the scene through a window with the circle object stuck outside the window; right: the scene is seen outside the screen and the immersion feeling is great)
Figure 3:
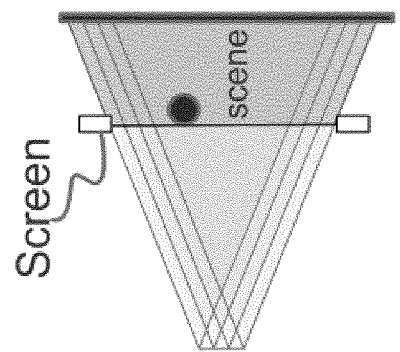
Figure 3:
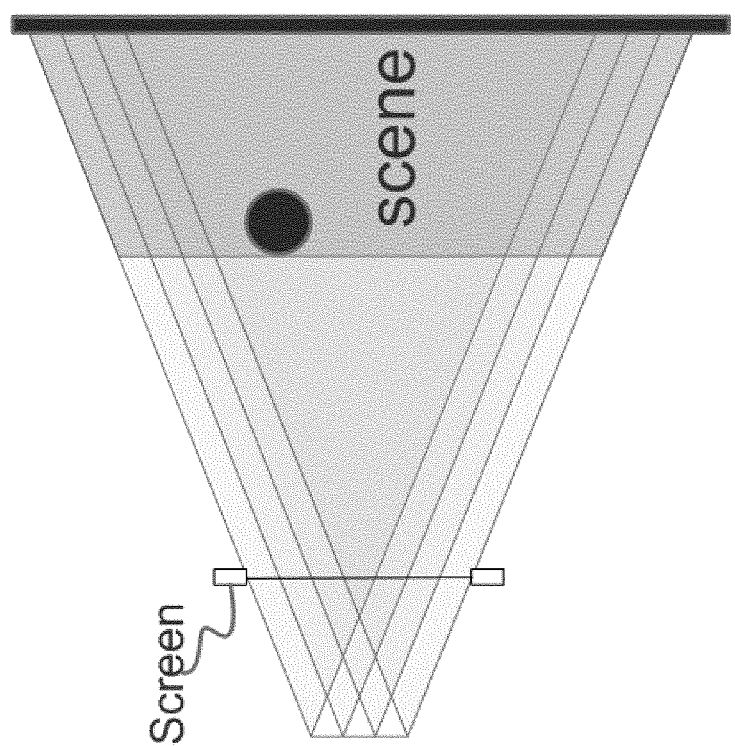

In one embodiment of the disclosure, if the user wants a strong immersion feeling, therefore, the entire content should appear outside the screen (see FIG. 3, right). In another embodiment, if the user wants to look as if the scene is seen through a window, he has to translate the scene so that a foreground object in the scene is stuck outside with the window (FIG. 3, center). In another embodiment, when the scene is translated so that desired plane is stuck to the screen, then it is necessary to scale the content so that the entire scene can be viewed (FIG. 3, left).

Hence, an anchor plane should be chosen in order to obtain a desired immersion feeling for a user. The anchor plane corresponds to the plane (in the scene) where objects or elements appear to be static (compared to the movement of the user), or appear to be put on the plane of the screen of the display device.

In the following, a description on how to perform this translation and scaling operations, is provided, allowing to define the transformation matrix H.

Figure 4:
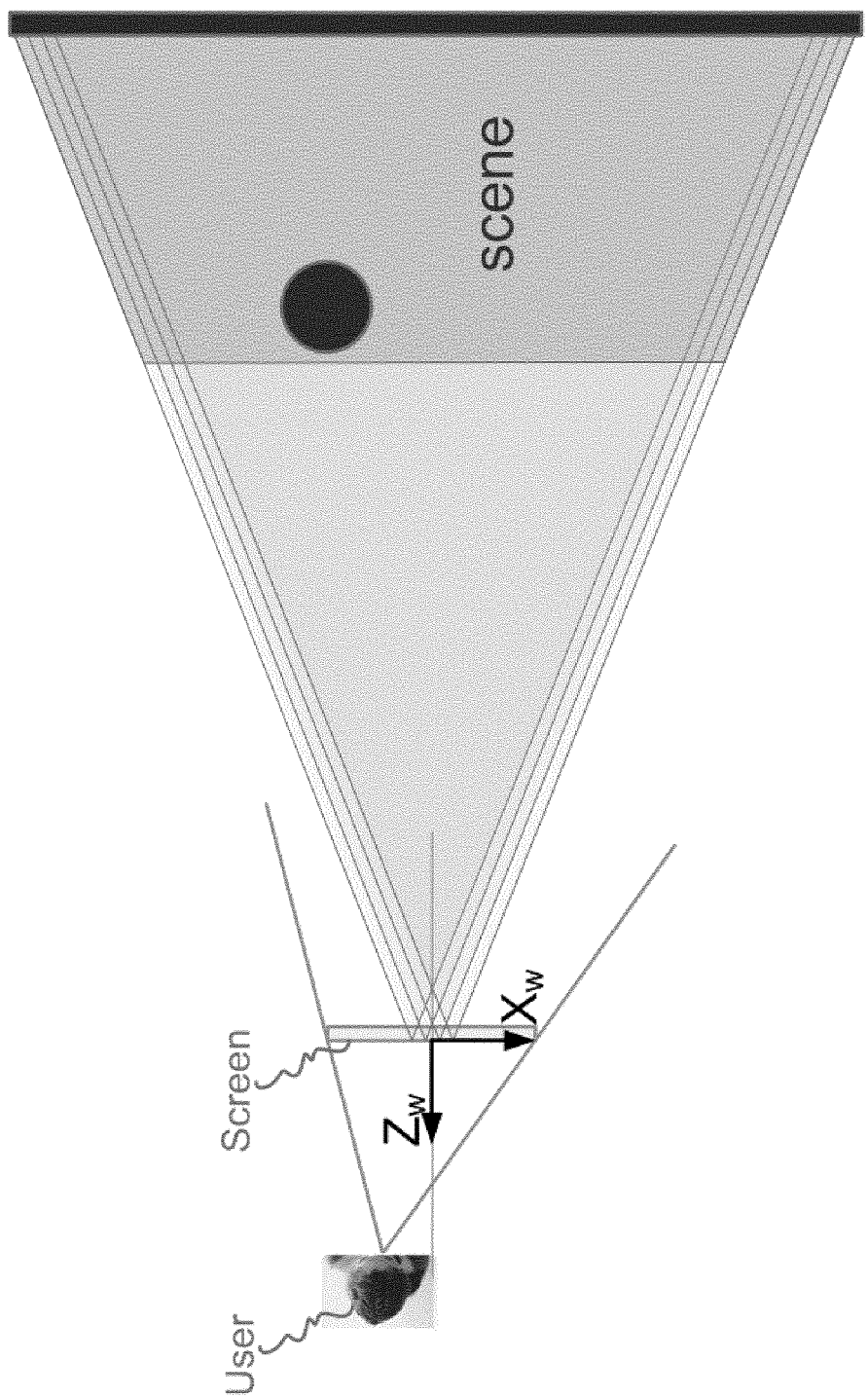
FIG. 4 presents an example of merging of the content and the screen without transformation of the content (normalized screen width)

In a first step, a projection formula with a H matrix defined as an identity matrix is used, enabling to obtain the configuration shown on FIG. 4.

In a second step, the user can select which plane has to be "sticked" on the screen plane (i.e. the anchor plane). This define a translation in Z direction of the 3D points issued from MVD.

$$H = T_{anchor} = \begin{bmatrix} 1 & 0 & 0 & 0 \\ 0 & 1 & 0 & 0 \\ 0 & 0 & 1 & t_z \\ 0 & 0 & 0 & 1 \end{bmatrix}$$

where $t_z$ corresponds to a translation parameter.

Figure 5:
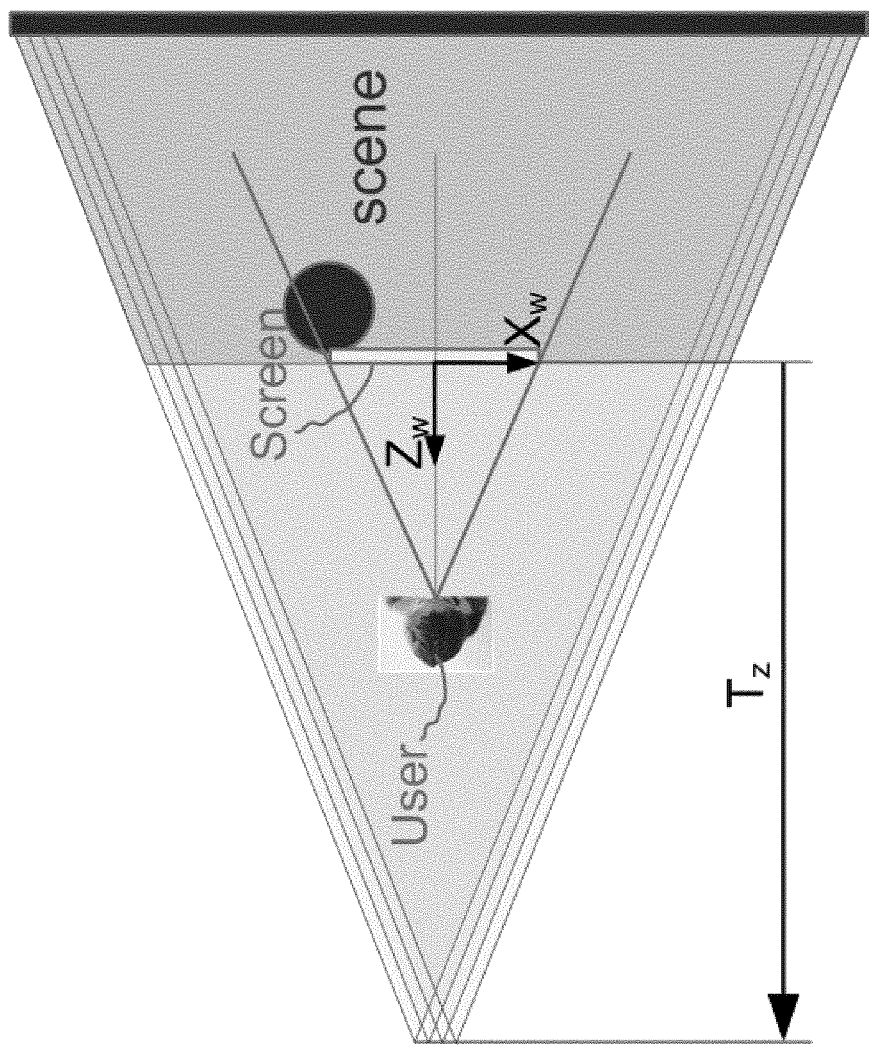
FIG. 5 presents an example of translation of content to obtain a "window" effect.
Figure 6:
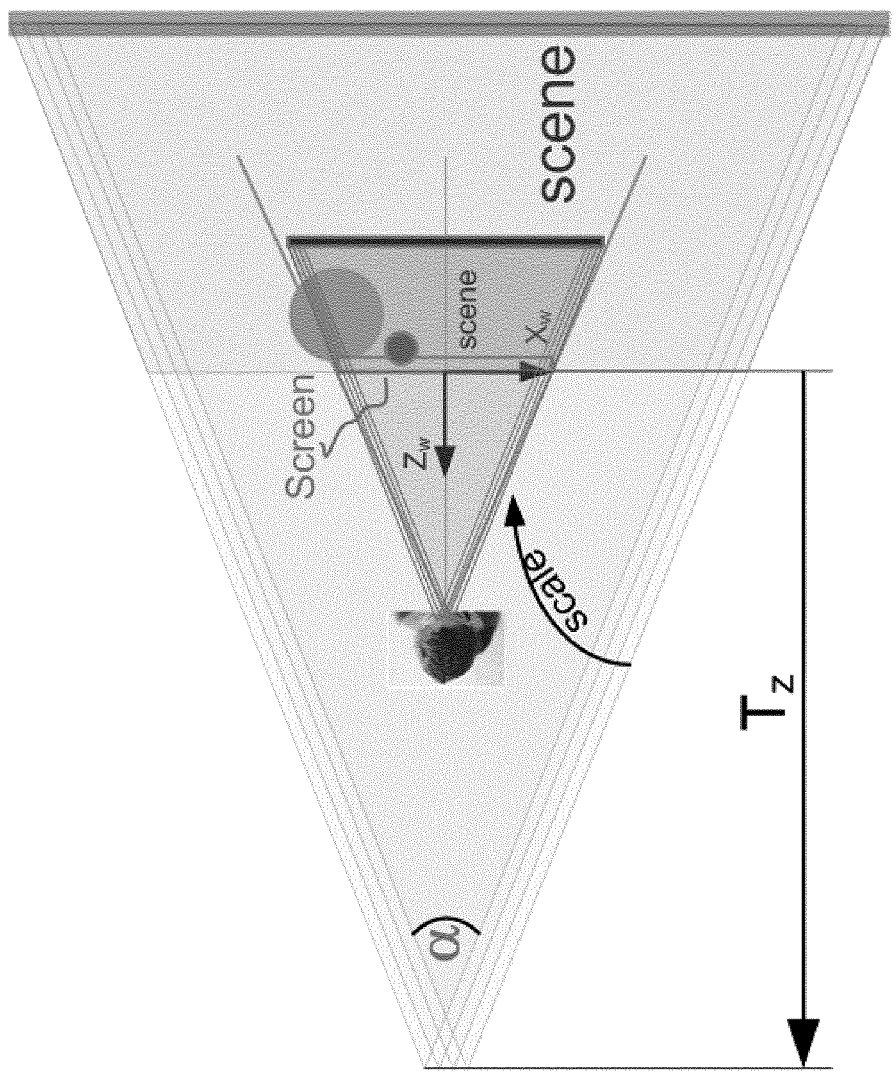
FIG. 6 presents another example of translation-scaling transformation to obtain a "window" effect.

However, by looking at FIG. 5, it clearly appears that the user loses a major part of the possible visualization experience with such configuration. Hence, in one embodiment of the disclosure, it is proposed to perform a scale down of the content. This is represented in FIG. 6. Note that depending on content, acquisition system and conditions, the scale factor could be superior to 1.0. Therefore, in a third step, an electronic device determines/computes the transformation matrix H as follows:

$$H = S * T_{anchor} = \begin{bmatrix} s & 0 & 0 & 0 \\ 0 & s & 0 & 0 \\ 0 & 0 & s & 0 \\ 0 & 0 & 0 & 1 \end{bmatrix} * \begin{bmatrix} 1 & 0 & 0 & 0 \\ 0 & 1 & 0 & 0 \\ 0 & 0 & 1 & t_z \\ 0 & 0 & 0 & 1 \end{bmatrix}$$

In fact, the scale factor can be automatically computed to get the entire field of view onto screen. From a calibration process, it is possible to obtain the acquisition field of view angle (written α); then as first approximation s can be estimated with the following equation:

$$s = \frac{W_{screen}}{W_{scene_{z=t_z}}} = \frac{W_{screen}}{2 * t_z * tg(\alpha/2)}$$

Figure 7:
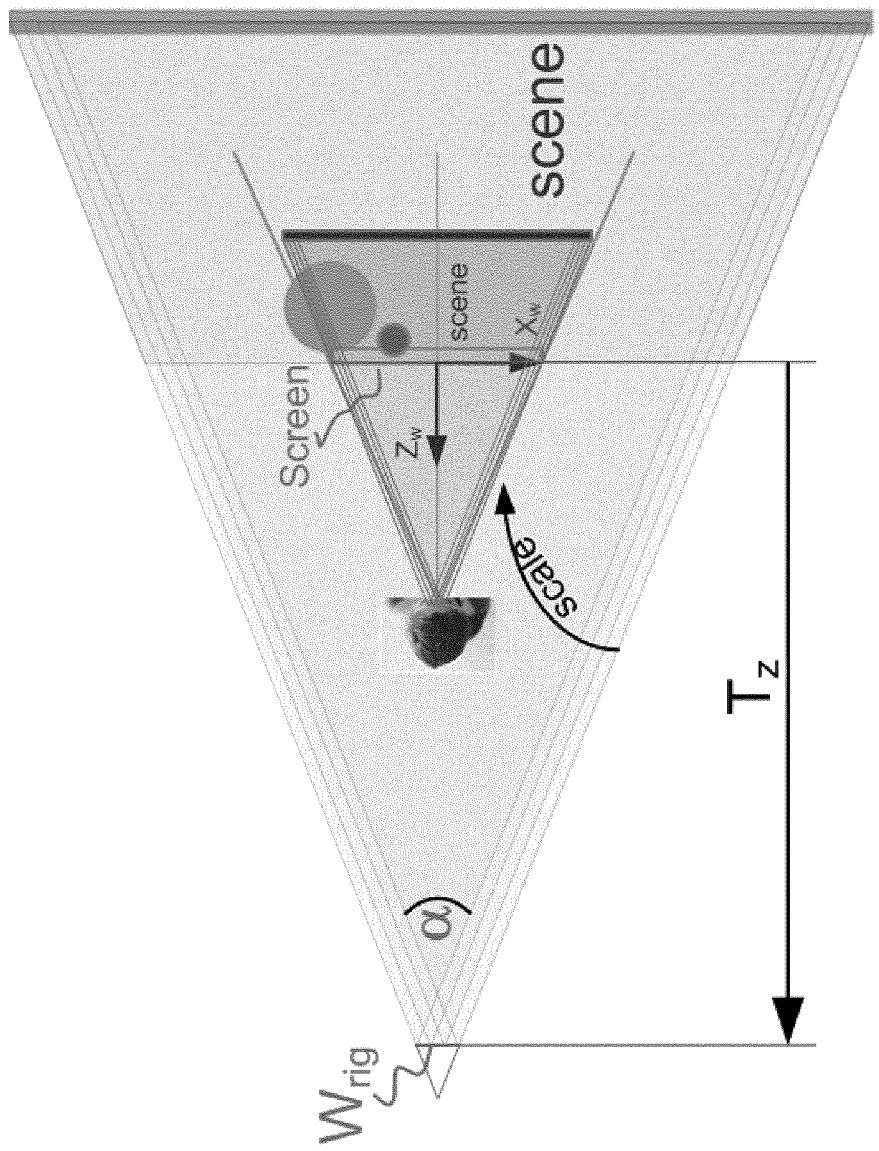
FIG. 7 presents another example of translation-scaling transformation to obtain a "window effect"

However, if we take into account the rig width (corresponding to the maximal horizontal distance between two cameras in the camera rig) as represented in the FIG. 7, we obtain an exact formula.

$$s = \frac{W_{screen}}{W_{scene_{z=t_z}}} = \frac{W_{screen}}{2 * t_z * tg(\alpha/2) + W_{rig}}$$

To summarize, the transformation for scene adaptation to the screen can comprise the following steps:
  the user defines the translation in Z direction he wants to apply to the scene depending on the experience type he wants (i.e. it determines an anchor plane);
  the scale factor is computed to get the maximum field of view of the scene (it should be noted that in one embodiment of the disclosure, such step is not necessary).

Concerning the User Positioning

As the user position is usually not fixed, it is possible to determine his/her position versus the screen thanks to the use of a head or eye tracker.

Figure 8:
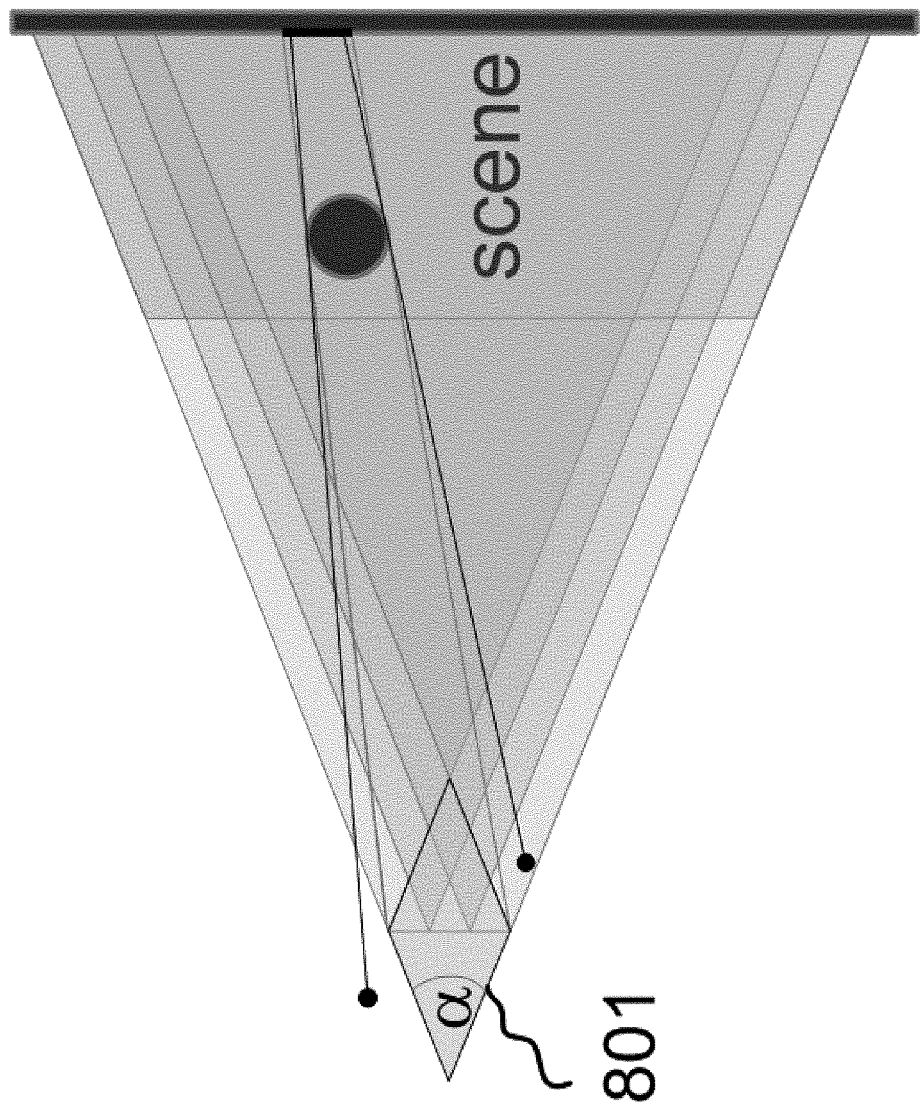
FIG. 8 presents a volume of points of view without dis-occlusions (points in black are examples of positions in which occluded area are visible)

Considering only the acquisition system, it is possible to determine in which volume we are in conditions that we have information on all visible points in the scene. This is represented in the FIG. 8 as a diamond referenced 801, knowing that in fact this is a volume.

According to one embodiment of the disclosure, it is proposed a technique that can:
  characterize this volume when the scene is projected onto the screen;
  provide the possibility of increasing or decreasing its size (in the case the original size is too small, or in the case in the case the original size is too big); and
  guide the user to stay in this modified and correct volume (in term of presence of disocclusions).

In order to determine the volume, the first elements that have to be taken into account are the width and the field of view of the acquisition system characterized by tg(α/2) and $W_{rig}$.

In addition, we have also to take into account the transformation we make on the scene to perform visualization as required by the user (via the parameters s and $t_z$). We have seen that we are obliged to scale the scene size to get a correct visualization. Unfortunately, this scales also the diamond volume of correct visualization. A second effect is that, when the scale is inferior to 1.0, it makes the diamond volume closer to the screen.

Figure 9:
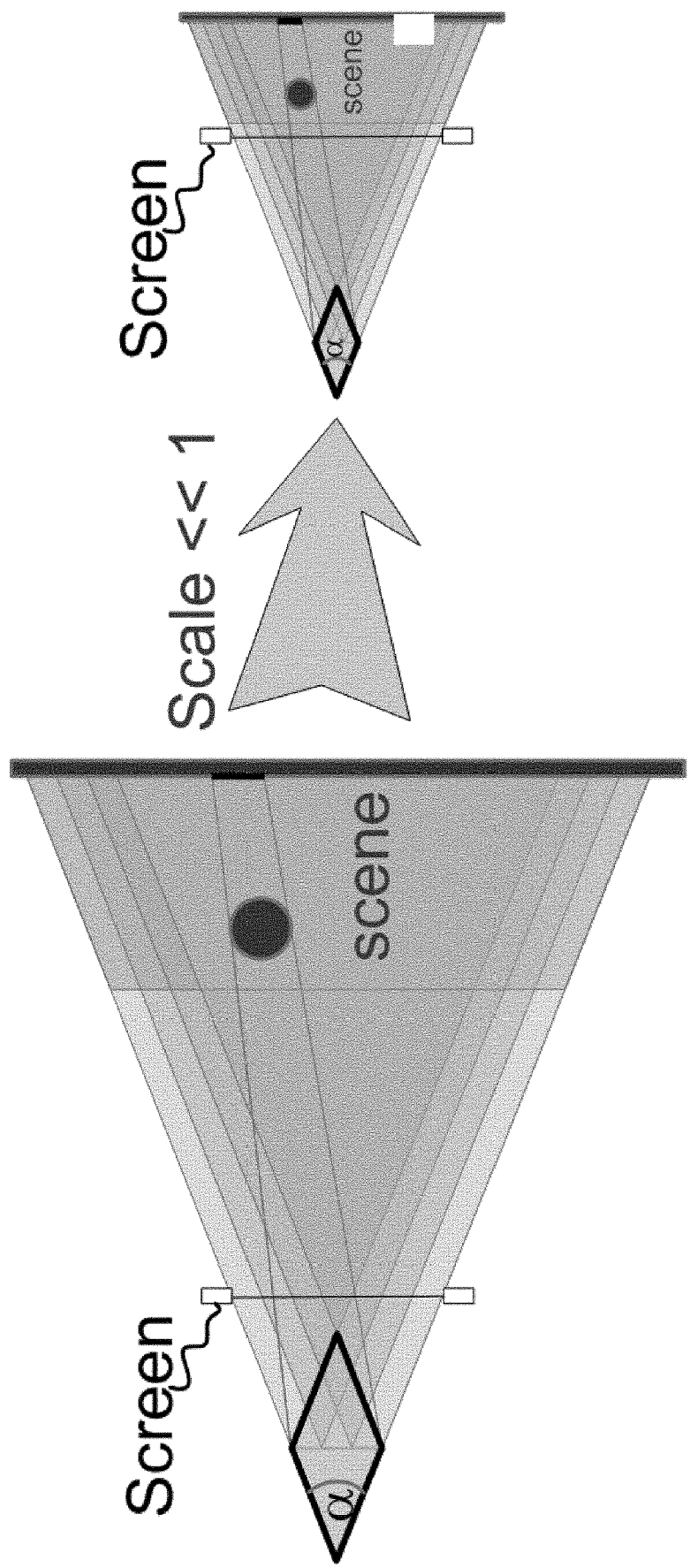
FIG. 9 presents the scaling of the diamond volume due to the scene translation/scaling for visualization.
Figure 10:
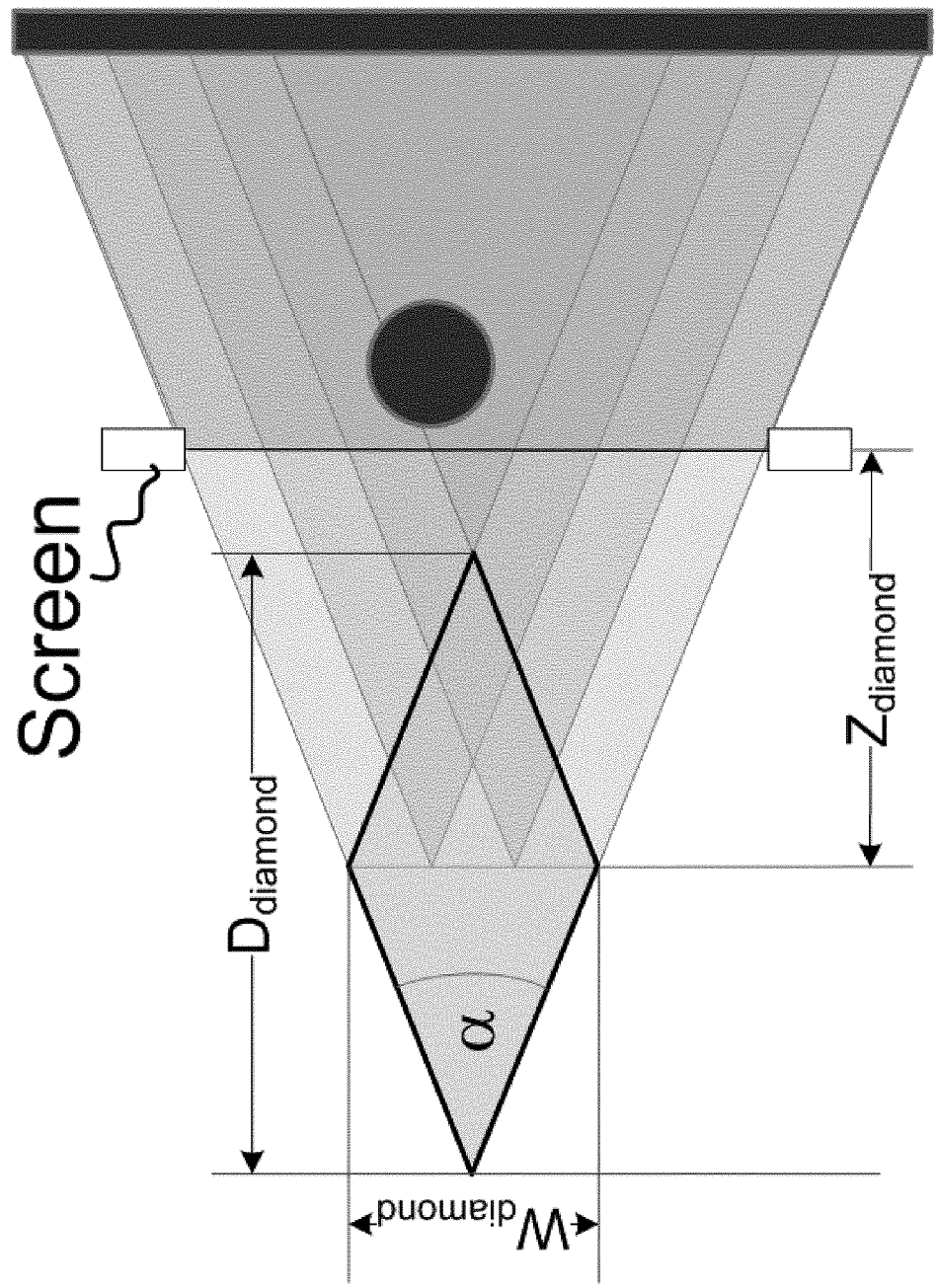
FIG. 10 present some parameters used for modifying the diamond volume.

FIG. 9 depicts the effect of the application of a scaling of a diamond volume.

This implies that:
  for large scenes, generally, a large rig is preferable (Medium rig—20 cm*20 cm—are adapted for small scenes, close to the cameras);
  to get a relatively high range of Z for visualization, it is advised to have camera with small field of view.

The parameters of the diamond volume are the following (after the transformations previously defined)

$$W_{diamond} = W_{rig} * s * W_{screen}$$

$$D_{diamond} = W_{rig} * tg(\alpha/2) * W_{screen}$$

$$Z_{diamond} = s * t_z * W_{screen}$$

These dimensions in many configurations are not appropriate for nice visualization of content, especially in the case that dimensions (width and depth) too small, or in the case the user is too much close to the screen (Z).

In one embodiment of the disclosure, in order to overcome this limitation, it is proposed to modify the size of the volume.

Figure 11:
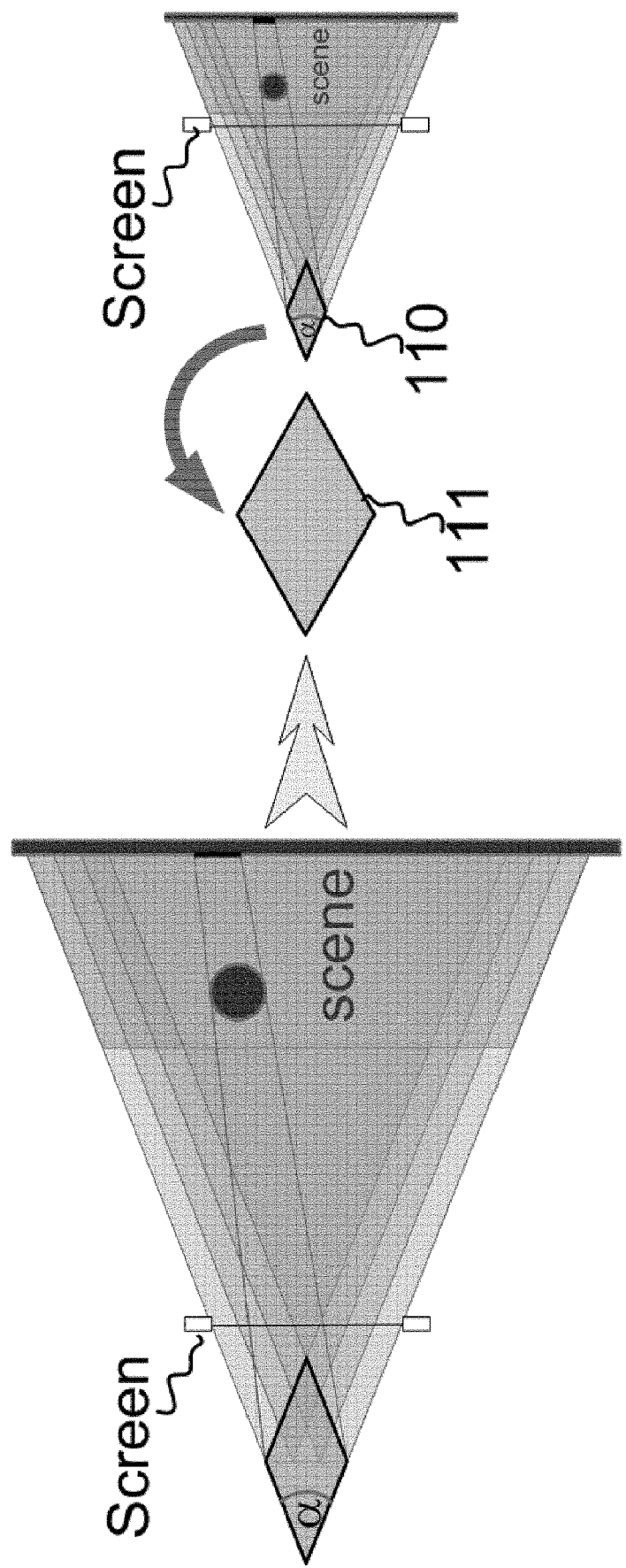
FIG. 11 presents schematically the modification of a diamond volume according to one embodiment of the disclosure.

The FIG. 11 shows how we will proceed. At the right part of the FIG. 11, the diamond volume referenced 110 corresponds to the correct zone of visualization, but this zone is too small and also to close to the screen. So we define a zone referenced 111 when user wants to be, but we compute the image as if the user was inside the diamond 110.

This requires to define the transformation between the real zone 110 and the transformed zone 111.

Aa a consequence, the movement is a little bit less realistic but the brain is sufficiently flexible to accept the difference.

The following remark can be done: an analogy can be made with a very wide spread situation: when a spectator looks at a movie on a screen while the field of view (focal) of the acquisition camera is completely different of the focal corresponding to the triangle composed by his eye and the surface of the screen.

Figure 12:
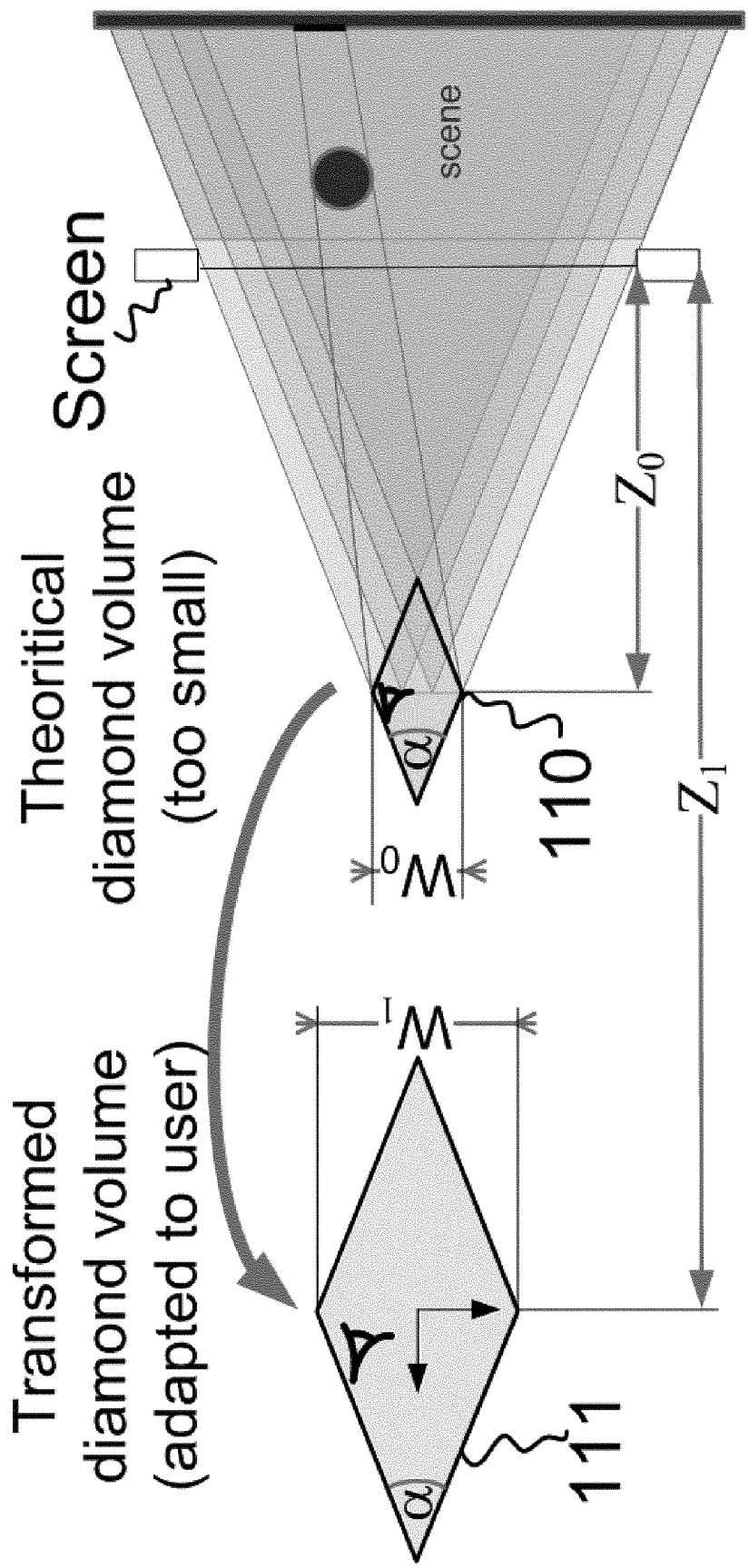
FIG. 12 depicts an example of a modified diamond volume compared to an original diamond volume.
Figure 13:
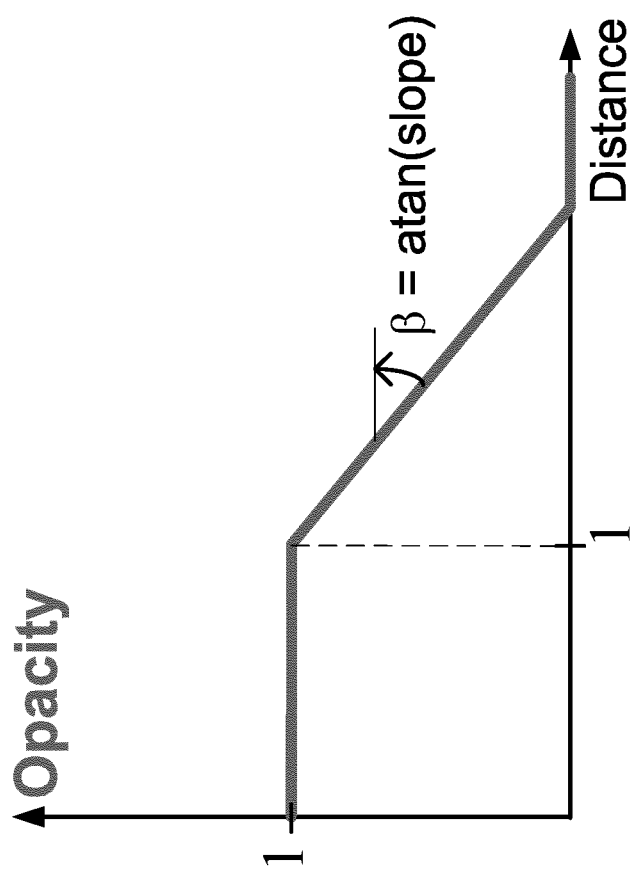
FIG. 13 presents the variation of an opacity factor as a function of a normalized distance.

In order to transform the diamond volume, it is necessary to define some parameters: as there are many possibilities to manage this transformation, we propose to define one way via the use of the two following parameters:

head$_{sensitivity}$ is a factor by which we reduce the sensibility of the head movements. Lower is the sensibility, greater is the diamond that the user can move (zone 111). So head$_{sensitivity}$ is most often <1.0. Referring for instance to the FIG. 12 head$_{sensitivity}$=W$_0$/W$_1$ $Z_{head_{scaling}}$ is a factor by which we enlarge the distance of the diamond volume by dividing the $Z_{diamond}$ with this factor (so $Z_{head_{scaling}}$ is most often <1.0). Referring for instance to the FIG. 12, $Z_{head_{scaling}}$=Z$_0$/Z$_1$.

It should be noted that we present generally as example the case where scene is scaled down to adapt the scene width to the screen and as a consequence, the original diamond volume in which the content can be correctly viewed is reduced and/or becomes too much close to the screen. However, the proposed equations and methods can also be adapted to cases where the scene is scaled up and the diamond volume becomes too large and/or too far from the screen for a comfortable experience. These cases can occur in several different and complex conditions, for instance when the objects in scene are very close to the acquisition system (microscopy is an example but not exclusively) and/or the user is close to a wide screen and necessary scaling of the scene is small in comparison.

In the following, details concerning the use of these parameters are provided:

Normally there is a direct equality between the position of the head provided by the head detector and the eye position used in the K$_{eye}$ matrix. To operate the transformation of the diamond zone, we compute the head position in the desired diamond volume 111 and we transform it so that the head becomes in the original one 110.

$$\begin{bmatrix} X \\ Y \\ Z \end{bmatrix}_{eye} = $$

$$head_{sensitivity} * \left( \begin{bmatrix} 1 & 0 & 0 \\ 0 & 1 & 0 \\ 0 & 0 & Z_{head_{scaling}} \end{bmatrix} \left( \begin{bmatrix} X \\ Y \\ Z \end{bmatrix}_{head} - \begin{bmatrix} 0 \\ 0 \\ Z_{diamond} \end{bmatrix} \right) \right) + \begin{bmatrix} 0 \\ 0 \\ Z_{diamond} \end{bmatrix}$$

According to one embodiment of the disclosure, it is proposed a technique for guiding the user in modified diamond volume.

In one embodiment of the disclosure, it is proposed to use an attenuation of the displayed content. More precisely, when the user goes out of the diamond volume he will see non-defined surfaces that can look like holes. Indeed, out of the volume, disocclusion regions are present, and the display device may have to use the value of the pixels associated to these regions (that can be either a fixed and pre-determined value). In order to prevent the display of these values, it is proposed to use an attenuation of images and drawing of arrows that signal that the user is outside the diamond and which direction he/she has to go toward in order to go back in the correct volume.

The attenuation of the rendered scene can be computed using the L1 normalized distance versus the diamond center:

$$D_{xz_{eye}} = \frac{|X_{eye}|}{Width_{diamond}/2} + \frac{|Y_{eye}|}{Height_{diamond}/2} + \frac{|Z_{eye} - Z_{diamond}|}{Depth_{diamond}/2}$$

Then we define also an attenuation slope (slope$_{attenuation}$) in order to make the attenuation more or less progressive when the user go out the diamond volume, and we compute an opacity factor:

$$function_{opacity} = 1.0 + slope_{attenuation} * (1 - D_{eye})$$

Then $$alpha_{opacity} = \begin{cases} = 0 \text{ if } function_{opacity} < 0 \\ = 1 \text{ if } function_{opacity} > 1 \\ = function_{opacity} \text{ elsewhere} \end{cases}$$

In another embodiment of the disclosure, it is proposed to use guiding arrows for helping the user to get a good viewing position within the modified diamond volume.

We compute an opacity factor for arrow in each direction and we choose the direction having the greatest value among the following factors:

$$x_{right_{distance}} = \left| 1 - \frac{X_{eye}}{Width_{diamond}/2} \right|$$

$$x_{left\_distance} = \left| 1 + \frac{X_{eye}}{Width_{diamond}/2} \right|$$

$$y_{top_{distance}} = \left| 1 - \frac{Y_{eye}}{Height_{diamond}/2} \right|$$

$$y_{bottom_{distance}} = \left| 1 + \frac{Y_{eye}}{Height_{diamond}/2} \right|$$

$$z_{far_{distance}} = \left|1 - \frac{Z_{eye} - Z_{diamond}}{Depth_{diamond}/2}\right|$$

$$z_{near_{distance}} = \left|1 + \frac{Z_{eye} - Z_{diamond}}{Depth_{diamond}/2}\right|$$

Then we compute an opacity factor for the arrow corresponding for the chosen direction.

We give here only the example for X_right (in that case X is negative and the arrow advise the user to go to the right).

$$right_{opacity} = slope_{attenuation} * \left(-1 - \frac{X_{eye}}{Width_{diamond}/2} + \frac{|Y_{eye}|}{Height_{diamond}/2} + \frac{|Z_{eye} - Z_{diamond}|}{Depth_{diamond}/2}\right)$$

Then the opacity factor is clipped between 0 and 1.

Therefore, according to the present disclosure, we can get an immersive experience of real content acquired by a 4D light field acquisition device or system under conditions where there is no disocclusion.

This is achieved by the following technical features:
means for determining a correct theoretical visualization volume in front of the display device;
means for adapting the volume dimension and position so that it is more convenient for the user;
means for delivering guiding information to the user to warn him up when he goes outside the volume.

Figure 14:
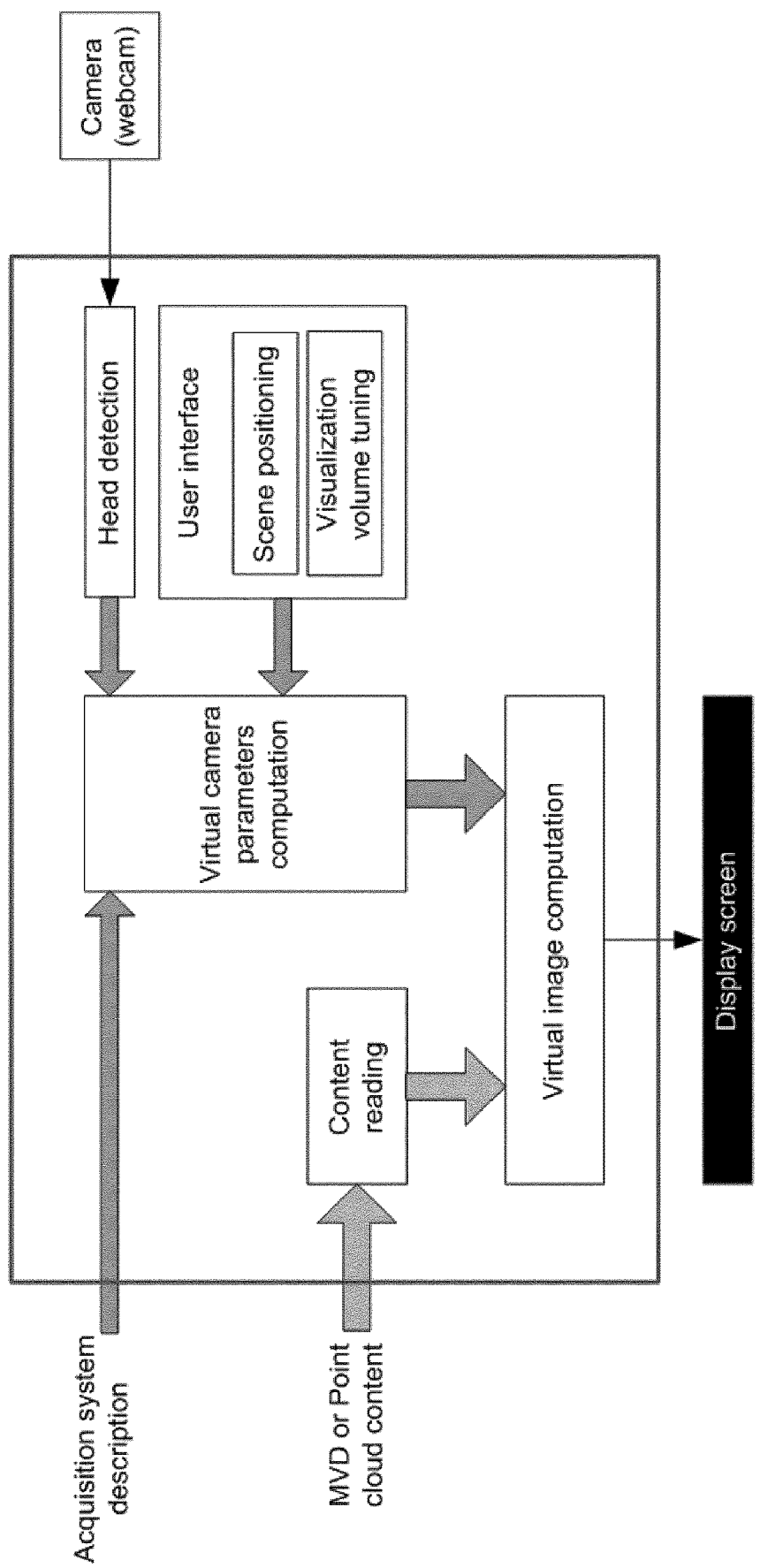
FIG. 14 presents a block diagram of a system according to one embodiment of the disclosure.

FIG. 14 presents some blocks of a system according to one embodiment of the disclosure.

The system has been developed under Windows, in C++ and GLSL (OpenGL) languages and QT for man machine interface. The head tracker function has been implemented using functionalities provided by OpenCV library.

Figure 15:
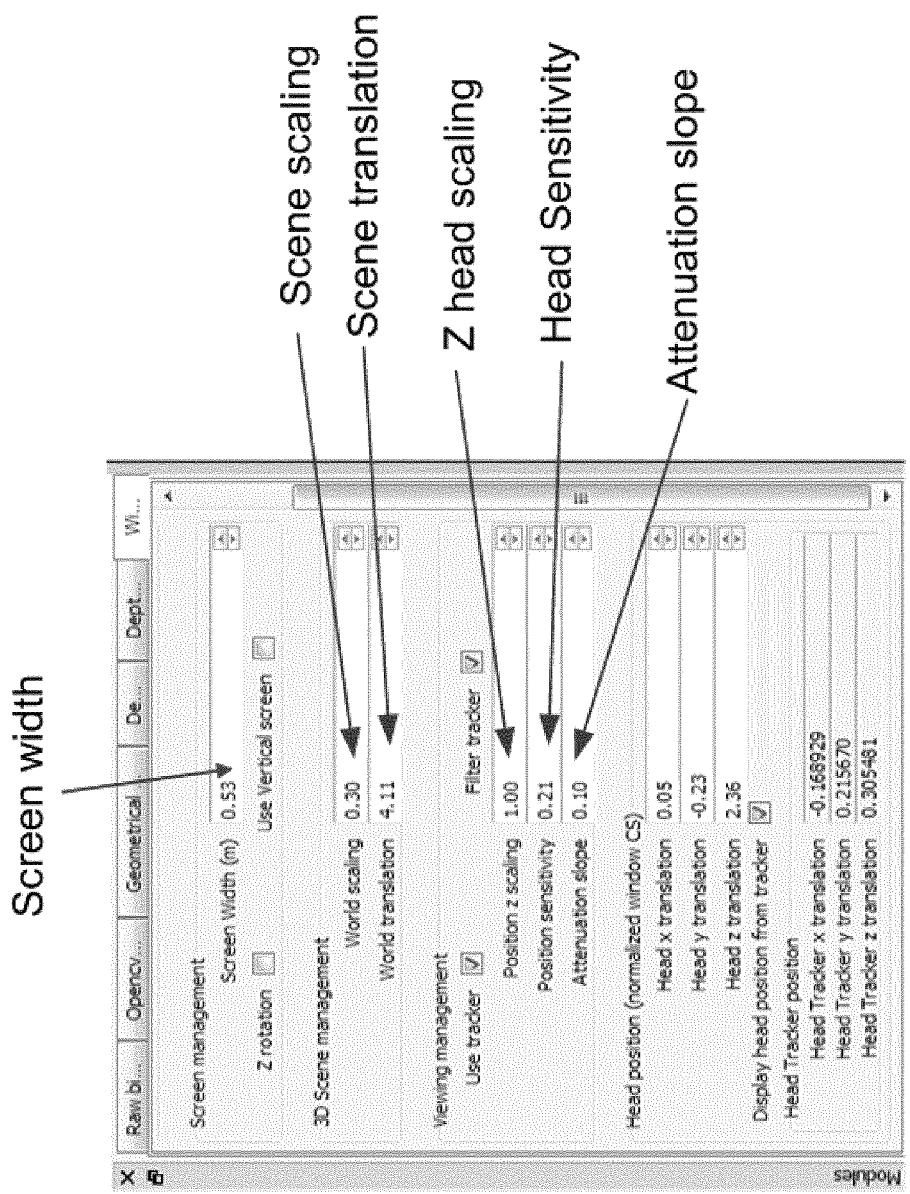
FIG. 15 presents an example of a graphic user interface (GUI) for selecting some parameters according to one embodiment of the disclosure.

FIG. 15 presents an example of GUI (Graphics User Interface) to tune the parameters.

Figure 16:
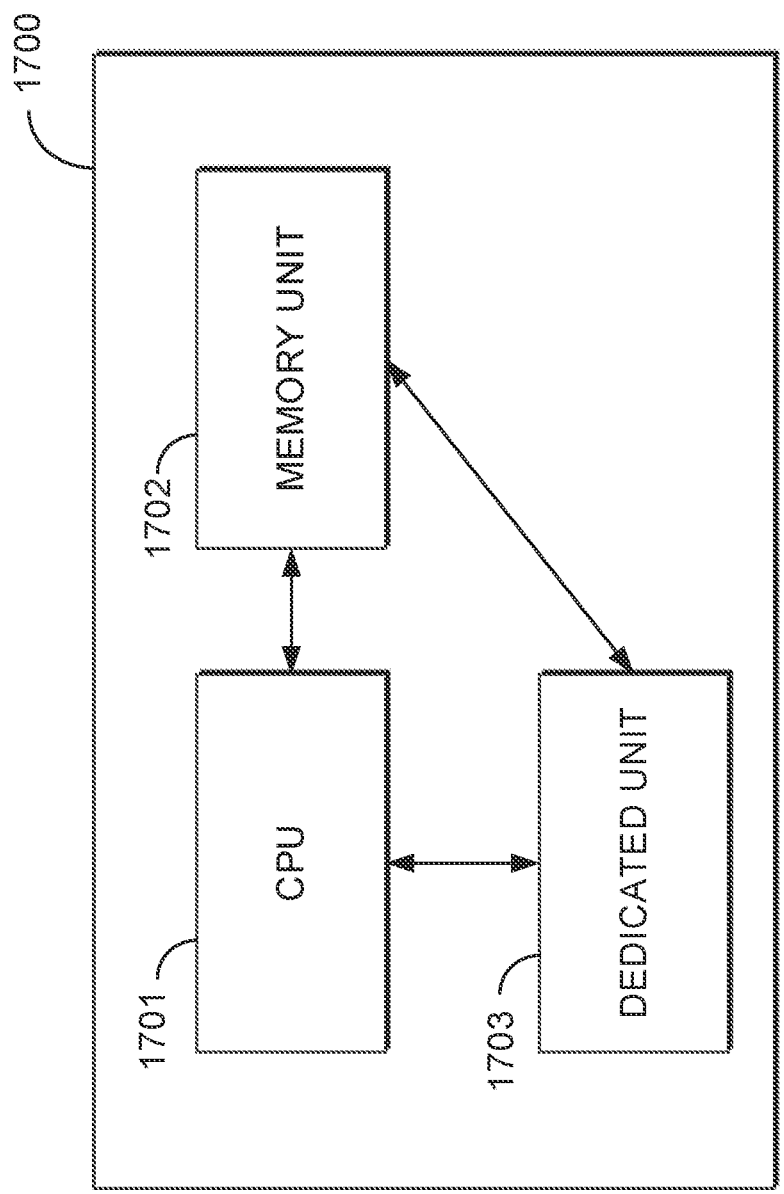
FIG. 16 presents an example of a device that can be used to perform one or several steps of methods disclosed in the present document.

FIG. 16 presents an example of a device that can be used to perform one or several steps of methods disclosed in the present document.

Such device referenced 1700 comprises a computing unit (for example a CPU, for "Central Processing Unit"), referenced 1701, and one or more memory units (for example a RAM (for "Random Access Memory") block in which intermediate results can be stored temporarily during the execution of instructions a computer program, or a ROM block in which, among other things, computer programs are stored, or an EEPROM ("Electrically-Erasable Programmable Read-Only Memory") block, or a flash block) referenced 1702. Computer programs are made of instructions that can be executed by the computing unit. Such device 1700 can also comprise a dedicated unit, referenced 1703, constituting an input-output interface to allow the device 1700 to communicate with other devices. In particular, this dedicated unit 1703 can be connected with an antenna (in order to perform communication without contacts), or with serial ports (to carry communications "contact"). It should be noted that the arrows in FIG. 16 signify that the linked unit can exchange data through buses for example together.

In an alternative embodiment, some or all of the steps of the method previously described, can be implemented in hardware in a programmable FPGA ("Field Programmable Gate Array") component or ASIC ("Application-Specific Integrated Circuit") component.

In an alternative embodiment, some or all of the steps of the method previously described, can be executed on an electronic device comprising memory units and processing units as the one disclosed in the FIG. 16.

The invention claimed is:

1. A method for displaying, on a 2D display device, a content derived from 4D light field data, based on a viewing position of a user, said 4D light field data corresponding to data acquired by either a plurality of cameras or by a plenoptic device, wherein said method comprises:
obtaining a first three-dimensional area in front of said 2D display device in which no disocclusions are present, said first three-dimensional area being defined according to optical and geometry parameters of an acquisition device that has acquired said 4D light field data, a size of a screen of said 2D display device, and an anchor plane in said content, said anchor plane being perceived as static in case of movement of a user relative to said 2D display device;
determining a transformation between the first three-dimensional area and a second three-dimensional area, such that each viewing position of a user in the second three-dimensional area transforms to a corresponding transformed position in the first three-dimensional area; and
guiding said user within said second three-dimensional area according to said viewing position of said user.

2. The method for displaying according to claim 1, wherein said transformation uses a head sensibility parameter of said user and/or an estimated distance between said user and said screen of said 2D display device.

3. The method for displaying according to claim 1, wherein said acquisition device is either a camera array device or a plenoptic camera.

4. The method for displaying according to claim 1, further comprising obtaining said viewing position of said user via an eye tracker device.

5. The method for displaying according to claim 1, further comprising selecting said at least one anchor plane by said user.

6. The method for displaying according to claim 1, further comprising automatically determining said at least one anchor plane according to a position of said user.

7. The method for displaying according to claim 1, wherein said 4D light field data is represented via a point cloud representation.

8. The method for displaying according to claim 1, wherein said 4D light field data is represented via a matrix of views and depth maps.

9. The method for displaying according to claim 1, wherein said guiding comprises displaying visual indicators on said screen of said display device.

10. The method for displaying according to claim 9, wherein said visual indicators comprise luminosity variation of a scene associated with said displayed content derived from 4D light field data.

11. The method for displaying according to claim 1, wherein said guiding comprises delivering audio indicators by said display device.

12. The method for displaying according to claim 1, wherein said first three-dimensional area is further defined according to a scene scaling parameter and/or a scene translation parameter chosen by said user.

13. The method for displaying according to claim 1, wherein said second three-dimensional area is larger than said first three-dimensional area, for enabling wider movements of a user positioned within the second three-dimensional area compared to movements of corresponding transformed positions within said first three-dimensional area.

14. The method for displaying according to claim 1, wherein said second three-dimensional area is smaller than said first three-dimensional area, for reducing a scope of movements of a user positioned within the second three-dimensional area compared to movements of corresponding transformed positions within said first three-dimensional area.

15. An electronic device comprising a memory and a processor, said electronic device being configured to display, on a 2D display device, a content derived from 4D light field data, based on a viewing position of a user, said 4D light field data corresponding to data acquired by either a plurality of cameras or by a plenoptic device, wherein said processor is configured to:
- obtain an indicator of a first three-dimensional area in front of said 2D display device in which no disocclusions are present, said first three-dimensional area being defined according to optical and geometrical parameters of an acquisition device that has acquired said 4D light field data, a size of a screen of said 2D display device, and an anchor plane in said content, said anchor plane being perceived as static in case of movement of a user relative to said 2D display device;
- determine a transformation between the first three-dimensional area and a second three-dimensional area, such that each viewing position of a user in the second three-dimensional area transforms to a corresponding transformed position in the first three-dimensional area; and
- provide information for guiding said user within said second three-dimensional area according to said viewing position of said user.

16. The electronic device according to claim 15, wherein the processor is further configured to use a head sensibility parameter of said user and/or an estimated distance between said user and said screen of said 2D display device to determine the transformation.

17. The electronic device according to claim 15, wherein said acquisition device is either a camera array device or a plenoptic camera.

18. The electronic device according to claim 15, wherein the processor is further configured to obtain said viewing position of said user via an eye tracker device.

19. The electronic device according to claim 15, wherein the processor is further configured to select said at least one anchor plane by said user.

20. The electronic device according to claim 15, wherein the processor is further configured to automatically determine said at least one anchor plane according to a position of said user.

21. The electronic device according to claim 15, wherein said 4D light field data is represented via a point cloud representation.

22. The electronic device according to claim 15, wherein said 4D light field data is represented via a matrix of views and depth maps.

23. The electronic device according to claim 15, wherein said processor is further configured to display on said screen of said display device information for guiding corresponding to visual indicators.

24. The electronic device according to claim 23, wherein said visual indicators comprise luminosity variation of a scene associated with said displayed content derived from 4D light field data.

25. The electronic device according to claim 15, wherein the processor is further configured to deliver using said display device information for guiding corresponding to audio indicators.

26. The electronic device according to claim 15, wherein said first three-dimensional area is further defined according to a scene scaling parameter and/or a scene translation parameter chosen by said user.

27. The electronic device according to claim 15, wherein said second three-dimensional area is is larger than said first three-dimensional area, for enabling wider movements of a user positioned within the second three-dimensional area compared to movements of corresponding transformed positions within said first three-dimensional area.

28. The electronic device according to claim 15, wherein said second three-dimensional area is smaller than said first three-dimensional area, for reducing a scope of movements of a user positioned within the second three-dimensional area compared to movements of corresponding transformed positions within said first three-dimensional area.

29. A computer-readable and non-transitory storage medium storing a computer program comprising a set of computer-executable instructions to implement a method for processing 4D light field data when the instructions are executed by a computer, wherein the instructions comprise instructions, which when executed, configure the computer to perform a method comprising:
- obtaining a first three-dimensional area in front of a 2D display device in which no disocclusions are present, said first three-dimensional area being defined according to optical and geometry parameters of an acquisition device that has acquired said 4D light field data, a size of a screen of said 2D display device, and an anchor plane, said anchor plane being perceived as static in case of movement of a user relative to said 2D display device;
- determining a transformation between the first three-dimensional area and a second three-dimensional area, such that each viewing position of a user in the second three-dimensional area transforms to a corresponding transformed position in the first three-dimensional area; and
- guiding said user within said second three-dimensional area according to said viewing position of said user.

30. The method of claim 1, further comprising:
using the transformation, determining a transformed position that corresponds to a current viewing position of the user; and
displaying the content on the 2D display device based on a current transformed position that corresponds to a current viewing position of the user.

* * * * *